(12) United States Patent
Ben-Asher et al.

(10) Patent No.: US 10,301,506 B2
(45) Date of Patent: May 28, 2019

(54) FULL SCALE PROCESS FOR PREPARING POLYMER POWDERS

(71) Applicant: CYMER-DAYTON, LLC, Decatur, TN (US)

(72) Inventors: Limor Ben-Asher, Cresskill, NJ (US); David Edward Noga, Spring City, TN (US); Zhongliang Zhu, Fremont, CA (US); Anderson Bouton, Chattanooga, TN (US)

(73) Assignee: Cymer-Dayton, LLC, Decatur, TN (US)

( * ) Notice: Subject to any disclaimer, the term of this patent is extended or adjusted under 35 U.S.C. 154(b) by 209 days.

(21) Appl. No.: 15/249,290

(22) Filed: Aug. 26, 2016

(65) Prior Publication Data

US 2017/0349713 A1    Dec. 7, 2017

Related U.S. Application Data

(60) Provisional application No. 62/346,440, filed on Jun. 6, 2016, provisional application No. 62/347,020, filed (Continued)

(51) Int. Cl.
*C08J 3/14* (2006.01)
*C09D 179/08* (2006.01)
(Continued)

(52) U.S. Cl.
CPC ............. *C09D 179/08* (2013.01); *B01J 2/02* (2013.01); *C08G 73/1003* (2013.01); *C08G 73/14* (2013.01); *C08J 3/14* (2013.01); *C08J 7/047* (2013.01); *C09D 5/1637* (2013.01); *C09D 7/20* (2018.01); *C08J 2379/08* (2013.01); *C08J 2479/08* (2013.01); *C08K 5/0008* (2013.01)

(58) Field of Classification Search
None
See application file for complete search history.

(56) References Cited

U.S. PATENT DOCUMENTS 3,267,074 A    8/1966   Wood
4,205,162 A    5/1980   Herscovici
(Continued)

FOREIGN PATENT DOCUMENTS

WO    2015144663    10/2015

OTHER PUBLICATIONS

PCT/US2017/35999 International Search Report dated Aug. 28, 2017.
(Continued)

*Primary Examiner* — Mary Lynn F Theisen

(57) ABSTRACT

A process for preparing polymer. An embodiment of a method includes generating a resin solution including a first reaction solvent and a polymer resin dissolved therein; deploying the resin solution into a precipitation solvent contained in a chamber of a reaction vessel, wherein deploying the resin solution includes generating droplets of the resin solution; disturbing a resulting mixture of the resin solution and the precipitation solvent, wherein the mixture produces a precipitate; and generating a polymer powder from the mixture, including isolating the precipitate from a remaining portion of the mixture, and drying the isolated precipitate.

25 Claims, 5 Drawing Sheets

Related U.S. Application Data on Jun. 7, 2016, provisional application No. 62/346,443, filed on Jun. 6, 2016.

(51) Int. Cl.
| | |
|---|---|
| *B01J 2/02* | (2006.01) |
| *C08G 73/10* | (2006.01) |
| *C08G 73/14* | (2006.01) |
| *C09D 7/20* | (2018.01) |
| *C09D 5/16* | (2006.01) |
| *C08J 7/04* | (2006.01) |
| *C08K 5/00* | (2006.01) |

(56) References Cited

U.S. PATENT DOCUMENTS

| | | | |
|---|---|---|---|
| 4,259,221 A | 5/1981 | Pauze | |
| 4,480,088 A | 10/1984 | Pike | |
| 5,133,908 A * | 7/1992 | Stainmesse | A61K 8/0241 264/4.1 |
| 5,135,974 A | 8/1992 | Moore | |
| 5,196,507 A * | 3/1993 | Totani | C08G 64/40 523/328 |
| 6,048,924 A | 4/2000 | Obayashi et al. | |
| 6,172,129 B1 | 1/2001 | Fan et al. | |
| 6,187,899 B1 * | 2/2001 | Asao | C08G 73/10 528/125 |
| 6,232,372 B1 | 5/2001 | Brothers et al. | |
| 6,420,466 B1 | 7/2002 | Haubennestel et al. | |
| 6,479,581 B1 | 11/2002 | Ireland et al. | |
| 6,627,727 B1 * | 9/2003 | Yoshida | C08G 65/46 528/491 |
| 7,998,370 B2 | 8/2011 | Hama et al. | |
| 8,669,305 B2 | 3/2014 | Fujimoto et al. | |
| 2002/0042457 A1 * | 4/2002 | Yuan | C08J 3/14 523/319 |
| 2005/0025978 A1 | 2/2005 | Okada et al. | |
| 2005/0215689 A1 | 9/2005 | Garbar et al. | |
| 2008/0312356 A1 | 12/2008 | Kobrin et al. | |
| 2011/0160421 A1 * | 6/2011 | Tople | C08G 65/46 528/86 |
| 2011/0237748 A1 * | 9/2011 | Podobinski | A61J 1/00 525/56 |
| 2013/0217812 A1 | 8/2013 | Sidenstick et al. | |
| 2015/0299513 A1 | 10/2015 | Kelly et al. | |
| 2016/0215105 A1 * | 7/2016 | Erbes | C08G 75/23 |

OTHER PUBLICATIONS

PCT/US2017/35997 International Search Report dated Aug. 28, 2017.

PCT/US2017/35998 International Search Report dated Aug. 28, 2017.

* cited by examiner

| Ex. # | Resin Solution | Lot # | Concen. % Solids | Visc (cps) | Resin Temp. (°F) | Precip. Solution | Precip. Soln. Temp. (°F) | Target Ratio of Intial MEK Charge | Nozzle Type | Fluid Cap | Air Cap | Liquid Press. (psi) | Air Presure (psi) | Feed Rate (g/min.) |
|---|---|---|---|---|---|---|---|---|---|---|---|---|---|---|
| Ex. 1 | 3615-26 | 11 15079 | 26 | 5339 | 71 | MEK | 71 | 2.9 | | | | | | |
| Ex. 2 | 3615-26 | 11 15079 | 26 | 5339 | 71 | MEK | 71 | 2.9 | | | | | | |
| Ex. 3 | 3615-26 | 11 15079 | 26 | 5339 | 71 | MEK | 50 | 2.9 | | | | | | |
| Ex. 4 | 3615-26 | 11 16013 | 26 | 1280 | 71 | MEK | 71 | - | 1/4J | 100150 | 1891125-SS | 80 | 30 | 3.6 |
| Ex. 5 | 3615-26 | 11 16013 | 26 | 5339 | 71 | MEK | 71 | - | 1/4J | 100150 | 1891125-SS | 80 | 75 | 9.5 |
| Ex. 6 | 3615-26 | 11 16013 | 26 | 5339 | 71 | MEK | 71 | - | 1/4J | 100150 | 108-SS | 80 | 75 | 27.5 |
| Ex. 7 | 3615-26 | 11 16013 | 26 | 5339 | 71 | MEK | 71 | - | 1/4J | 60100 | 12-SS | 80 | 75 | 10 |
| Ex. 8 | 3615-26 | 11 16013 | 26 | 5339 | 71 | MEK | 71 | - | 1/4J | 60100 | 1401110-SS | 80 | 75 | 7.0/62.1 |
| Ex. 9 | 3615-26 | 11 15079 | 26 | 5339 | 71 | MEK | 50 | 2.2 | 1/4 LNN 316SS Atomizing | - | - | 80 | - | 500 |
| Ex. 10 | 3615-26 | 11 16013 | 26 | 5339 | 71 | MEK | 50 | 2.2 | 1/4 LNN 316SS Atomizing | - | - | 30 | - | 2268 |
| Ex. 11 | 3615-26APH | ZZ1-44-APH | 28 | 23390 | 71 | MEK/Acetone | 71 | 2.9 | | | | | | |
| Ex. 12 | 3615-26 | 11 16013 | 26 | 5339 | 71 | MEK | 71 | 2.2 | 1/4J | 100150 | 1891125-SS | 80 | 75 | 71.8 |
| Ex. 13 | 3615-26 | 11 16013 | 26 | 5339 | 71 | MEK | 71 | 2.2 | 1/4J | 100150 | 1891125-SS | 80 | 75 | 72.9 |
| Ex. 14 | 3615-26 | 11 16013 | 26 | 5339 | 71 | MEK | 71 | 2.2 | 1/4J | 100150 | 1891125-SS | 80 | 75 | 71.8 |
| Ex. 15 | 3615-26 | 11 16013 | 26 | 5339 | 71 | MEK | 71 | 2.2 | 1/4J | 100150 | 1891125-SS | 80 | 75 | 71.8 |
| Ex. 16 | 3615-26 | 11 16013 | 26 | 5339 | 71 | MEK | 71 | 2.2 | 1/4J | 100150 | 1891125-SS | 80 | 75 | 72.9 |

Fig. 4A

| Ex. # | Agitator (RPM) | Choppers (RPM) | Ratio 1st and 2nd MEK | Screening/ Powder Separation | Drying Mthod/ Temp. | Disposition | Mean Particle Size (um) | d95 (um) |
|---|---|---|---|---|---|---|---|---|
| Ex. 1 | Lab (200) |  | 1.2 | Decantation | Oven/50° C | Noodles - Add'l Agitation Time Needed | 164 | 352.5 |
| Ex. 2 | Silverson (4000) |  | 1.2 | Decantation | Oven/50° C | Fine Powder | 80 | 278 |
| Ex. 3 | 100% |  | 1.2 | J-Tube/Nutsche Filter | Dryer/122° F | Oversize/Noodles - Griding Needed | 31.3 | 70.07 |
| Ex. 4 |  |  | - | Lab Vacuum Filtration | Oven/50° C | Fine Powder | 167 | 323 |
| Ex. 5 |  |  | - | Lab Vacuum Filtration | Oven/50° C | Fine Powder | 199 | 329 |
| Ex. 6 |  |  | - | Lab Vacuum Filtration | Oven/50° C | Fine Powder | 146 | 248 |
| Ex. 7 |  |  | - | Lab Vacuum Filtration | Oven/50° C | Fine Powder | 152 | 301 |
| Ex. 8 |  |  |  | Lab Vacuum Filtration | Oven/50° C | Fine Powder | 197 | 328 |
| Ex. 9 | 150 | 100% | 1.1 | FSI Filter/Decantation | Oven/50° C | Seiving Required | 232 | 503 |
| Ex. 10 | 95 | 100% | 1.1 | FSI Filter/Decantation | Oven/50° C | Add'l Washings Needed | 141 | 210 |
| Ex. 11 | Silverson (4000) |  | 1.2 (Acetone) | Decantation | Oven/50° C | Fine Powder | 54 | 120 |
| Ex. 12 |  |  | 1.1 | Lab Vacuum Filtration | Oven/50° C | Little Powder Due To Aggregation During Precipitation | 229 | 324 |
| Ex. 13 | Lab (200) |  | 1.1 | Lab Vacuum Filtration | Oven/50° C | Powder Produced But All Reaggregated Into Solid Mass | - | - |
| Ex. 14 | Silverson (4000) |  | 1.1 | Lab Vacuum Filtration | Oven/50° C | Powder With Some Aggregation | 314 | 646 |
| Ex. 15 | Silverson (4000) |  | 1.1 | Centrifuge | Oven/50° C | Fine Powder | 135 | 260 |
| Ex. 16 | Lab (200) |  | 1.1 | Centrifuge | Oven/50° C | Fine Powder | 314 | 652 |

Fig. 4B

FULL SCALE PROCESS FOR PREPARING POLYMER POWDERS

The present patent application claims priority to and incorporates by reference U.S. Provisional Patent Application No. 62/346,440, entitled "Novel Full Scale Process for Preparing Polymer Powders", filed on Jun. 6, 2016; U.S. Provisional Patent Application No. 62/346,443, entitled "Preparation Of Polyamide-Imide Resins Using N-Formyl Morpholine: 3-Methoxy N,N-Dimethylpropanamide", filed on Jun. 6, 2016; and U.S. Provisional Patent Application No. 62/347,020, entitled "PAI-Based Coating Compositions", filed on Jun. 7, 2016.

TECHNICAL FIELD

Embodiments described herein generally relate to the field of chemical processing, and, more particularly, to a process for preparing polymer powders.

BACKGROUND

Polyamideimide and polyamide amic acid resin polymers (hereinafter referred to as PAI) are well-known thermally stable polymers that are used for many high performance coating applications due to their excellent adhesion, temperature resistance, and high strength.

The primary route to synthesizing polyamideimide polymers in a form that is convenient for the manufacture of coatings is by reacting diisocyanate, often 4,4'-methylene diphenyldiisocyanate (MDI) with trimellitic anhydride (TMA). In this process, PAI polymers are typically manufactured in polar aprotic solvents such as N-methyl amide compounds including dimethylformamide, dimethylacetamide, N-methylpyrrolidone (NMP), N-ethylpyrrolidone.

However, generation of a polymer powder commonly requires multiple processes in different environments, thus requiring a relatively complex and costly production process.

BRIEF DESCRIPTION OF THE DRAWINGS

Embodiments described here are illustrated by way of example, and not by way of limitation, in the figures of the accompanying drawings in which like reference numerals refer to similar elements.

FIG. 4A is a table to summarize a first part of the information regarding the examples; and FIG. 4B is a table to summarize a second part of the information regarding the examples.

DETAILED DESCRIPTION

Embodiments described herein are generally directed to generation of polymer powders.

In some embodiments, a process for preparing polymer powders with adjustable properties includes dissolving one or more polymers in a suitable solvent or combination of solvents, with the polymer solution being deployed and precipitated into a vigorously disturbed solution of one or more anti-solvents in a reaction vessel. In some embodiments, the deployment of the polymer solution includes breaking the polymer solution into droplets using a deployment element to deploy the droplets into the disturbed anti-solvents.

In a specific embodiment, a process for preparing polymer powder takes place in a horizontal reactor equipped with, for example, a large rotating agitator and vortexing choppers that provide the driving force necessary for the preparation of a fine powder. Benefits of an embodiment include that the powder may be isolated, washed, and dried in a single reactor. Moreover, the properties of the resulting powder may be tailored to fit a variety of applications by simultaneously optimizing the polymerization conditions, the resulting resin formulation, the choice of precipitation solvent, the deployment parameters, and additional horizontal reactor settings.

In some embodiments, a process of making a polymer powder includes deployment, such as spray precipitation, in a one-pot process using a horizontal reactor providing disturbance of a solution, such as high agitation of the solution, wherein the properties of the resulting powder are controlled using multiple aspects of the process such as the selection of spray nozzle or other deployment element, feed ratio, precipitation solvent choice and agitation rate. In particular, an embodiment of a process provides for generation of high performance polymers, such as PPS (Polyphenylene sulfide), PEEK (Polyether ether ketone), PI PI (Polyimide), and PAI which are in the same realm of the Polymer Pyramid. These polymers exhibit qualities such as superior chemical and temperature resistance along with enhanced mechanical properties.

In some embodiments, a process combining the benefits of forming droplets along with the control and one-pot nature of a horizontal reactor results in a controlled characterization and an easily dissolved polymer powder. In some embodiments, a polymer solution that contains one or more polymers dissolved in a solvent or solvent/co-solvent mixture may form droplets using a variety of different deployment techniques, including, but not limited to, spraying, misting, jetting, atomizing, or impregnation of droplets the polymer mixture. In some embodiments, a resulting isolated polymer may then be precipitated, washed, and dried, all in the same vessel.

Figure 1:
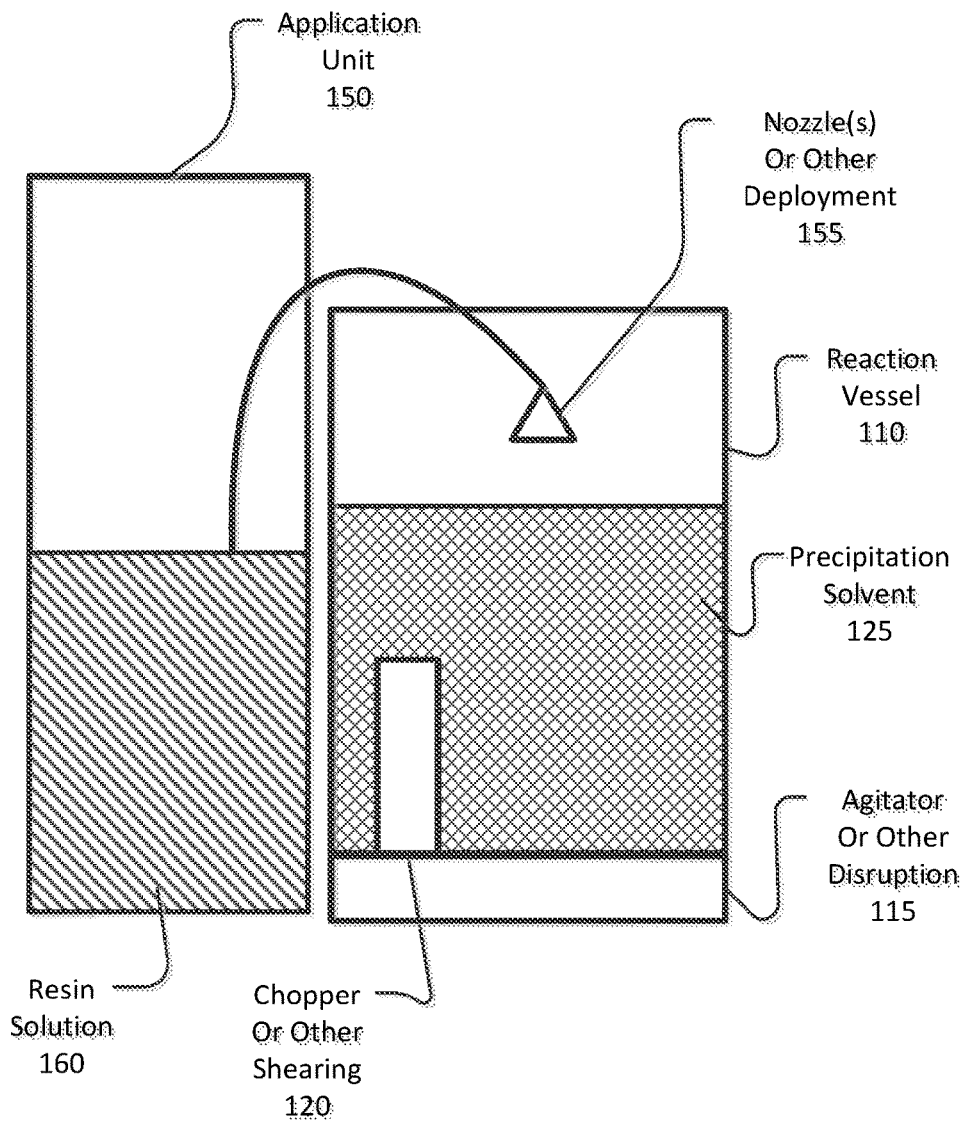
FIG. 1 illustrates manufacturing elements utilized in a process for generation of a polymer powder according to an embodiment.

FIG. 1 illustrates manufacturing elements utilized in a process for generation of a polymer powder according to an embodiment. In some embodiments, manufacturing elements 100 include a single reaction vessel 110 for generation of the polymer powder. In some embodiment, the vessel 110 is a horizontal vessel that includes an agitator or other disruption element 115 for providing disruption (such as agitation) in mixing of solutions and chopper or other shearing element 120 for the shearing (such as chopping or slicing) of generated polymer material to generate a powder substance. In some embodiments, the reaction vessel initially contains a precipitation solvent 125.

In some embodiments, manufacturing elements for generation of a polymer powder further include an application unit or mechanism 150, including one or more nozzles or other deployment element 155 for the deployment, such as spraying, misting, misting, jetting, atomizing, or impregnation of droplets, of a resin solution 160 into the precipitation solvent 125 to generate a mixture that results in precipitation of polymer material. In some embodiments, the resin solution 160 is a solution in which a polymer resin has been dissolved in a dissolution solvent. In a particular embodiment, such as illustrated in FIG. 1, the agitator 115 agitates the solution in the spraying and precipitation process, and the chopper 120 chops the resulting precipitate as needed in the formation of a polymer powder.

Figure 2B:
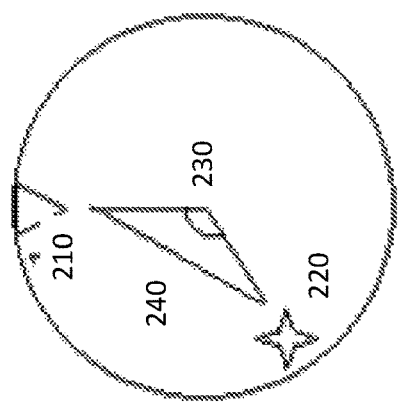
FIGS. 2A and 2B are schematic representations of a horizontal reactor in an embodiment.
Figure 2A:
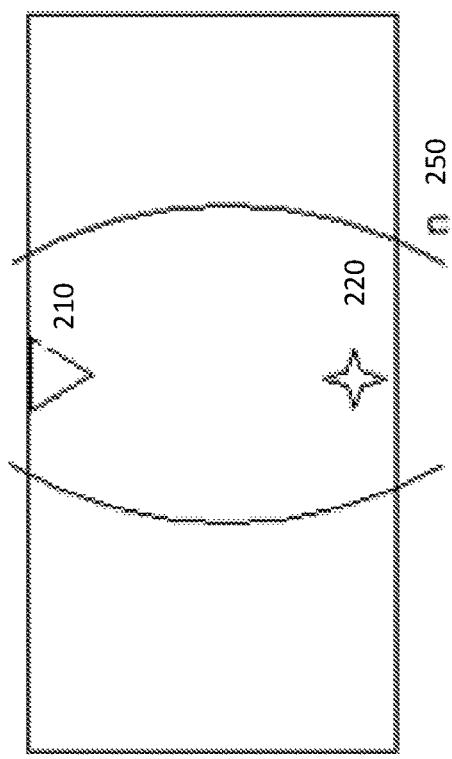

FIGS. 2A and 2B are schematic representations of a horizontal reactor in an embodiment. In some embodiments, a process provides for an efficient production of a PAI (or other polymer) powder based on certain parameters, the parameters including some or all of: the number and/or configuration of deployment elements, such as spray nozzles, for deploying of a polymer solution 210; the number and/or configuration of shearing elements, such choppers, for the reaction vessel 220; the angle 230 and distance between the deployment and shearing elements, such nozzles and choppers 240; the selection of, for example, nozzle:chopper pairings in the reactor 250; and/or other factors. In some embodiments, the process forgoes atomizing an anti-solvent and instead utilizes high agitation through the choppers, thereby taking advantage of a vortex of anti-solvent.

In some embodiments, a process combines the use of deployment elements, such as nozzles, to form droplets, including, but not limited to, spraying, misting, jetting, atomizing, impregnations, and more as examples, with the vigorous disruption of the solution such as, but not limited to, choppers, impellers, sonication, and other known methods that may break down resin, and the efficiency of a horizontal reactor may be used to isolate a variety of polymers in a controlled manner.

Many types of polymer solutions may be converted to the corresponding powder in a controlled fashion in an embodiment of a process. This process may be used with a variety of polymers/resins including, but not limited to, polyamides, polyamide imides, polyethers, polyether ether ketones, epoxide, polyether sulfones, polyesters, polyacrylates, polybenzimidazole, polyphenylene sulfides, polysulfones, and mixtures, derivatives, and/or copolymerizations thereof. An illustrative example of a suitable polymer is the polyamideimide (PAI) contained herein. PAI and solutions thereof have been used in various applications due to its excellent adhesion, temperature resistance, and high strength. Aside from solvent-based formulations, aqueous-based coating compositions comprised of the polyamic acid salt form of the polymer have been used for coating and sizing fibers, metal surfaces, glass substrates, and other materials. Such aqueous-based PAI coating solutions are vital as binders for use in the cookware industry. Herein, the term "polyamideimide" (or "PAI") also includes polyamic acid and salts of polyamic acid from which polyamideimide may be derived.

In an embodiment, the polymer solution includes a resin that is soluble in an organic or aqueous solution used to dissolve the material. The resulting resin solution may range from 10-90% solids. A higher percentage of solids is generally preferred for higher throughput—e.g., as limited by requirements of viscosity to allow for effective handling and spraying.

In some embodiments, the function of the reaction solvent (also referred to as a "dissolution" solvent) is to solubilize the resin. Additional co-solvents, thinning, thickening, or thixotropic agents may be added to further decrease or modify the viscosity for ease of transfer or spraying or to bring the resin solution closer to precipitation while still maintaining the solubility of the resin. Various embodiments utilize any of a variety of polymers/resins utilizing the appropriate dissolution solvent or solvent mixture by one who is skilled in the art including but not limited to alcohols, acetates, aldehydes, ethers, ketones, lactams, pyrrolidones, morpholines, morpholine derivatives, sulfoxides and mixtures thereof. More specifically solvents such as N-methyl-2-pyrrolidone (NMP), N-formyl morpholine (NFM) and N-acetyl morpholine (NAM), diethyl acetamide (DEAc), di-n-propyl acetamide, diacetylpiperazine, N,N-diisopropylacetamide (DIPAc), di-n-butylacetamide (DIBAc), di-n-propylacetamide (DIPA), and N-propionyl morpholine (NPM), methyl actetate, n-propyl acetate, t-butyl acetate, iso-butyl acetate, ethyl acetate, isopropyl acetate, methyl lactate, ethyl lactate, n-propyl lactate, isopropyl lactate, n-butyl lactate, isobutyl lactate, t-butyl lactate, cyclohexanone, cyclopentanone, n-butyl acetate, methyl alcohol, ethyl alcohol, isopropyl alcohol, anisol, n-acetyl morpholine, ε-caprolactone, methylcyclohexane, N-n-butylpyrrolidone, N-isobutylpyrrolidone, N-t-butylpyrrolidone, N-n-pentylpyrrolidone, N-(methyl-substituted butyl)pyrrolidone, ring-methyl-substituted N-propyl pyrrolidone, ring-methyl-substituted N-butyl pyrrolidone, N-(methoxypropyl)pyrrolidone, N-(methoxypropyl)pyrrolidone, 1,5-dimethyl-pyrrolidone and isomers thereof, dipropylene glycol dimethyl ether, a mixture including ethyl lactate and an ethyl ester derived from soya bean oil or corn oil, poly(ethylene glycol) dimethyl ether, diethylene glycol diethyl ether, 1,3-dioxolane, dimethyl sulphoxide, methyl-5-(dimethylamino)-2-methyl-5-oxopentanoate, TamiSolve® NxG from Eastman Chemical Co. of Kingsport, Tenn., propylene glycol methyl ether acetate, choline hydroxide, propylene carbonate, diethyl carbonate, glycerine carbonate, dimethylisopropylamine and isomers thereof, dihydrolevo glucosenone, octyl pyrrolidone and isomers thereof, N-methyl-ε-caprolactam, N,N,N',N'-tetramethylguanidine, 2-pyrrolidone, 2,2-dimethyl dioxolane-4-methanol and isomers thereof, Rhodiasolv® RPDE-K from Rhodia Chemical Co. of La Defense, France, Rhodiasolv® PolarClean from Rhodia Chemical Co., Rhodiasolv® Infinity from Rhodia Chemical Co., Rhodiasolv® IRIS from Rhodia Chemical Co., diethylethanolamine and, N-ethylmorpholine, γ-hexalactone, tetrahydrofuran (THF), furfuryl alcohol, acetophenone, cumene, cyclopentylmethyl ether, methyl-tetrahydrofuran (methyl-THF), N-octyl pyrrolidone, dioxalane, methylethylketone, dimethylsuccinate, N-methylcaprolactame and N-cyclohexylpyrrolidone. More preferably solvents such as methyl actetate, ethyl acetate, n-propyl acetate, iso-propyl acetate, n-butyl acetate, iso-butyl acetate, t-butyl acetate, methyl lactate, ethyl lactate, n-propyl lactate, iso-propyl lactate, n-butyl lactate, iso-butyl lactate, t-butyl lactate, cyclopentanone, cyclohexanone, methylcyclohexane, methyl alcohol, ethyl alcohol, n-propyl alcohol, iso-propyl alcohol, n-butyl alcohol, iso-butyl alcohol, 3-methoxy N,N-dimethylpropanamide (also known as "Equamide" or "Equamide M100" commercially available from Idemitsu or "KJCMPA-100" commercially available from KJ Chemicals or "3-methoxy-N,N-dimethylpropionamide"), n-acetyl morpholine, ε-caprolactone, and anisol may be used as dissolution solvents with the most preferably solvents of the embodiments of the present invention consisting from solvents such as methyl actetate, n-propyl acetate, ethyl acetate, isopropyl acetate, ethyl lactate, n-propyl lactate, n-butyl lactate, cyclohexanone, n-butyl acetate, isopropyl alcohol, anisole, ε-caprolactone, methylcyclohexane.

In some embodiments, because the concentration of a resin solution is directly proportional to the throughput, the preferred concentrations are 10-80% solids, with a more preferred range of 20-90% solids. In some embodiments, mixing ratios of resin solution to anti-solvent to reduce viscosity may vary between 90:10 to 10:90. A more preferred range is 80:20 to 20:80 solvent:anti-solvent. However, the ratio needs to be such that the resin is stable and does not precipitate or phase separate upon setting.

Although many different polymer/solvent combinations are possible in varying embodiments, for purposes of illustration the discussion here focuses on a polyamide-imide (PAI) resin. As previously mentioned, PAI resin polymers are well-known thermally stable polymers that are used for many high performance coating applications due to their excellent adhesion, temperature resistance, and high strength. PAI resins are used in solvent-based formulations for various coating uses. N-methyl-pyrrolidone (NMP) is a commonly-used solvent in a variety of coating applications. In the 1980's and 1990's NMP was used to produce "environmentally friendly" coatings, replacing cresol as the predominant solvent at that time. Now, however, NMP and n-ethyl-pyrrolidone (NEP) have been classified as reprotoxic chemicals, based on the EU REACH regulations. As a key sustainability initiative, Fujifilm Hunt has successfully developed a proprietary alternative solvent solution to the REACH-classified CMR (carcinogenic, mutagenic, reprotoxic) chemicals currently available for PAI coating applications.

In addition one of the most commonly used monomers, MDA: 4,4'-Methylene dianiline, has been authorized under Annex XIV by REACH with a classification of carcinogenic 1b and a sunset date of Aug. 21, 2014. As published the sunset date takes effect 18 months after it has been set. Therefore MDA cannot be placed on the market or used unless the company is granted authorization. MDI (4,4'-methylene diphenyldiisocyanate) is one alternative to MDA. FUJIFILM Chemical has managed to synthesize PAI in a new non-toxic CMR FREE solvent which has proven to perform as well as NMP/NEP based formulations.

However, reformulating with new solvents is not a simple matter of substitution. Various factors may need to be addressed if a different solvent is to be used. Some properties of a solvent that aid in determining its suitability for a given coating application include its solvency, polarity, relative evaporation rate, flash point and many additional parameters. Some embodiments may be utilized to produce highly soluble CMR-free PAI powders from the aforementioned CMR-free resins.

In an embodiment, a vessel, referred to herein as a pre-mixing vessel, holds a reaction solvent (also referred to as "dissolution" solvent) at a pressure that, for example, is in a range of 14.7 psi to 100 psi (in some embodiments, in a range of 14.7 psi to 80 psi) for transferring of the feed solution through the spray nozzles. Agitation while heating the solution may reduce the viscosity of the feed solution for adequate spraying and transfer to the spray nozzles. The solution may be diluted and mixed until the viscosity is homogeneous throughout. Equivalent viscosity and concentration throughout the resin solution may facilitate consistency of spraying. A jacket for temperature control may be utilized as this allows control of the temperature of the feed solution which will in turn affect the viscosity and flow rate. The temperature of the polymer solution may range between 0° C. to 100° C. more preferred 20° C. to 55° C. The viscosity of the sprayed solution may be in the range of 5 centipoise (cP) to 50,000 cP (in some embodiments, in a range of 50 cP to 6000 cP)—e.g., depending on the type(s) and/or configuration of nozzles.

The function of the precipitation solvent (also referred to as an "anti-solvent") is to precipitate out the polymer into a powder form. In some embodiments, a mean particle size of the powder is in a range of 10-800 microns (in some embodiments, in a range of 10 microns to 500 microns). The precipitation solvent may be miscible with the reaction solvent as phase separation of the two solvents may complicate the precipitation.

If too little precipitation solvent is used during the initial precipitation, the material will not form a powder and will instead form a gel or sludge. In the same manner, if not enough wash solvent is used to wash out the high boiling reaction solvent, the material will plasticize upon drying. In some embodiments, both the resin dissolution solvent and the precipitation solvent have low boiling points—e.g., to facilitate easy removal during a drying step. The boiling point may be in a range of 0° C. to 240° C. (in some embodiments, in a range of 50° C. to 240° C.). In some embodiments, the respective boiling points of the reaction solvent and precipitation solvent differ from one another— e.g., by an amount in a range of 10° C. to 50° C. A reaction solvent having a higher boiling point may tend to need to be washed out during processing by the anti-solvent—e.g., as opposed to being removed during a drying step. Having a significant difference in the boiling points aids in solvent recovery.

In some embodiments, the polarity of the precipitation solvent may depend on the resin system that is to be precipitated. For aromatic amides, polar aprotic solvents such as MEK may be more appropriate. For relatively more highly polar polymers, it may be more appropriate to use non-polar anti-solvents such as hexanes. Although some embodiments are not limited in this regard, the polymerization (reaction) solvent and anti-solvent (precipitation solvent) may both be from the same class of solvents (such as alcohols). For example, a polymer may be soluble in octanol but precipitate readily in methanol, both of which are alcohols. Spray precipitation processing according to some embodiments may be implemented with a variety of polymer/solvent:anti-solvent combinations or mixtures thereof.

Some embodiments use any of a variety of anti-solvents (precipitation solvents) or anti-solvent mixtures including but not limited to alcohols, acetates, aldehydes, ethers, ketones, lactams, pyrrolidones, morpholines, morpholine derivatives, sulfoxides, and mixtures thereof. More specifically solvents such as N-methyl-2-pyrrolidone (NMP), N-formyl morpholine (NFM) and N-acetyl morpholine (NAM), diethyl acetamide (DEAc), di-n-propyl acetamide, diacetylpiperazine, N,N-diisopropylacetamide (DIPAc), di-n-butylacetamide (DIBAc), di-n-propylacetamide (DIPA), and N-propionyl morpholine (NPM), methyl acetate, n-propyl acetate, t-butyl acetate, iso-butyl acetate, ethyl acetate, isopropyl acetate, methyl lactate, ethyl lactate, n-propyl lactate, isopropyl lactate, n-butyl lactate, isobutyl lactate, t-butyl lactate, cyclohexanone, cyclopentanone, n-butyl acetate, methyl alcohol, ethyl alcohol, isopropyl alcohol, anisol, n-acetyl morpholine, ε-caprolactone, methylcyclohexane, N-n-butylpyrrolidone, N-isobutylpyrrolidone, N-t-butylpyrrolidone, N-n-pentylpyrrolidone, N-(methyl-substituted butyl)pyrrolidone, ring-methyl-substituted N-propyl pyrrolidone, ring-methyl-substituted N-butyl pyrrolidone, N-(methoxypropyl)pyrrolidone, N-(methoxypropyl)pyrrolidone, 1,5-dimethyl-pyrrolidone and isomers thereof, dipropylene glycol dimethyl ether, a mixture including ethyl lactate and an ethyl ester derived from soya bean oil or corn oil, poly(ethylene glycol) dimethyl ether, diethylene glycol diethyl ether, 1,3-dioxolane, dimethyl sulphoxide, methyl-5-(dimethylamino)-2-methyl-5-oxopentanoate, Tami Solve® NxG from Eastman Chemical Co. of Kingsport, Tenn., propylene glycol methyl ether acetate, 3-methoxy N,N-dimethylpropanamide (also known as "Equamide" or "Equamide M100" commercially available from Idemitsu or "KJCMPA-100" commercially available from KJ Chemicals or "3-methoxy-N,N-dimethylpropionamide"), choline hydroxide, propylene carbonate, diethyl carbonate, glycerine carbonate, dimethylisopropylamine and isomers thereof, dihydrolevo glucosenone, octyl pyrrolidone and isomers thereof, N-methyl-ε-caprolactam, N,N,N',N'-tetramethylguanidine, 2-pyrrolidone, 2,2-dimethyl dioxolane-4-methanol and isomers thereof, Rhodiasolv® RPDE-K from Rhodia Chemical Co. of La Defense, France, Rhodiasolv® PolarClean from Rhodia Chemical Co., Rhodiasolv® Infinity from Rhodia Chemical Co., Rhodiasolv® IRIS from Rhodia Chemical Co., diethylethanolamine and, N-ethylmorpholine, γ-hexalactone, tetrahydrofuran (THF), furfuryl alcohol, acetophenone, cumene, cyclopentylmethyl ether, methyl-tetrahydrofuran (methyl-THF), N-octyl pyrrolidone, dioxalane, methylethylketone, dimethylsuccinate, N-methylcaprolactame and N-cyclohexylpyrrolidone may all be used as precipitation solvents or solvent mixture depending on the nature of the polymer material. More preferable solvents such as methyl acetate, ethyl acetate, n-propyl acetate, iso-propyl acetate, n-butyl acetate, iso-butyl acetate, t-butyl acetate, methyl lactate, ethyl lactate, n-propyl lactate, iso-propyl lactate, n-butyl lactate, iso-butyl lactate, t-butyl lactate, cyclopentanone, cyclohexanone, methylcyclohexane, methyl alcohol, ethyl alcohol, n-propyl alcohol, iso-propyl alcohol, n-butyl alcohol, iso-butyl alcohol, n-acetyl morpholine, ε-caprolactone, anisol may be used as precipitation solvents with the most preferably anti-solvents of the embodiments of the present invention consisting from solvents such as methyl ethyl ketone (MEK), acetone, methanol, methyl acetate, xylenes, n-propyl acetate, o-xylene, ethyl acetate, isopropyl acetate, ethyl lactate, n-propyl lactate, n-butyl lactate, cyclohexanone, n-butyl acetate, iso-propyl alcohol, anisole, water, ε-caprolactone, methylcyclohexane.

In some embodiments, the reaction vessel (which may also be referred to as the reactor or precipitation vessel) that holds the precipitation solvent (also referred to as an "anti-solvent") may be able to hold a volume of 50 to 5000 gallons and/or withstand pressures in a range of 14.7 to 100 psi. In an illustrative embodiment, the pressure of the precipitation reactor is at ambient pressure (14.7 psi), wherein a nitrogen sweep goes through a condenser to trap vapors which may be easily evaporated while spraying. The temperature of the precipitation vessel may be at ambient temperature (e.g., 71° C.), however, it may be in a range of 0° C. to 100° C. (for example)—e.g., based on conditions favoring rapid separation between the precipitated powder and the solvent mixture.

In some embodiments, the temperature of the chamber of the reaction vessel and precipitation solution may play a role in how effectively the reaction solvent is washed out of the resin powder and therefore affect the drying process. The reaction vessel may be a horizontal reactor where "horizontal" refers to the orientation of cylindrical portion of the reactor along with the agitator shaft. The spray precipitation and isolation techniques described herein are not limited to horizontal reactors and may be applied to additional reactor configurations such as continuous stirred tank reactors (CSTR), plug flow reactors, laminar-flow reactors and semi-batch reactors depending on the conditions implemented. For example, a CSTR may be used as the reaction vessel in conjunction with spray nozzles and choppers to create finely precipitated material which is washed by a stream of incoming fresh solvent and then pumped out through a high shear mixer to a centrifuge.

In some embodiments, a process includes disruption such as agitation to facilitate precipitation of resin. The vigorous mixing of the solution while the precipitation is occurring may be obtained by rotating agitators including but not limited to anchor, turbine or, corkscrew type which may operate in the range of 10-10,000 rpm. A more preferred is 50-500 rpm for commercial agitators. Additional smaller mixing components such as choppers may be utilized to improve the precipitation process which may operate in the range of 500-10,000 rpm, more preferred is 1000-5000 rpm. Other methods such as the use of baffles, recirculation lines, and in-line high shear mixers or a combination thereof may also be used for improved agitation and finer powder.

In some embodiments, a process or apparatus includes spraying of the polymer solution into the precipitation solvent may yield a powder material with improved particle size compared to the powder produced in a process where the resin solution is merely transferred through a line. This is due to the unique ability of the nozzle to "atomize" the polymer solution into tiny droplets allowing for a more effective precipitation. A variety of different nozzle types exist including high efficiency spray nozzles with plain or shaped orifice, surface impingement nozzle, air atomizing nozzles (both internal and external mix), as well as compound nozzles and internal and external two fluid mix nozzles. The spray nozzle or nozzles may provide particles with a mean size in a range of 1 micron to 1000 microns (e.g., in a range of 10 microns to 500 microns). The control of the particle size of the final powder may be based on any of the various parameters described herein. A specific nozzle type selected may be one that allows the resin to atomize or "spray" without clogging or bearding. Note that a manifold containing one of more nozzle types with different atomization technologies may be implemented to obtain a powder with optimal properties.

In some embodiments, a number of deployment elements such as active nozzles determines at least in part the feed rate of the polymer solution, with more nozzles and a larger diameter or cap opening allowing for a faster addition of the resin. The feed rate may vary from, for example, 1 pound per hour (pph) to 50,000 pph per nozzle (e.g., in a range of 50 pph to 500 pph per nozzle).

In some embodiments, other parameters that affect the feed rate include one or more of the viscosity, concentration, and temperature of the resin solution as well as the capacity or flow rate of the air or nitrogen source (in cubic feet/min or hour). Air atomizing nozzles use a combination of air pressure and liquid pressure to atomize the resin material. For these nozzles, the air pressure, supplied by either air or nitrogen, may be in a range of 2 psi to 1000 psi (e.g., in a range of 8 psi to 80 psi). The pressure placed on the liquid, which is usually nitrogen, may be in a range of 1 psi to 100 psi (in some embodiments, in a range of 5 psi to 70 psi).

In some embodiments, nozzles may be positioned that the spray angles do not overlap causing aggregation of the droplets before hitting the antisolvent and precipitation. This may be accomplished by proper placement or using a combination of different nozzle/cap types. Solvent may be primarily sprayed in a direction towards a majority volume of anti-solvent (e.g., toward a vortex of antisolvent caused by a chopper or other source of disruption). As illustrated in FIG. 2B, angle 230 and distance 240 from the chopper may result in spraying to hit the vortex created by the chopper or the surface of the agitating precipitation solvent and the distance being such that the round spray pattern produced by the nozzle is still maintained. The spray angles may not overlap, and may be oriented in such a way as to avoid interference from other objects such as reactor walls, baffles, and agitator blades.

In some embodiments, a feed rate of the sprayed polymer solution is based on any of a variety of parameters including, but not limited to, a number of nozzles and a pressure (of air or nitrogen) placed on the resin solution or in conjunction with the nozzle for atomization. Other parameters which may affect the feed rate include the viscosity, concentration, and temperature of the resin solution.

In some embodiments, washing (wherein the term "washing" refers to the removal of the reaction solvent by the precipitation solvent or other solvent in order to increase the final percentage of solids of the isolated powder) may be performed to remove the reaction solvent from the powder prior to drying. If not enough reaction solvent is removed from the powder prior to drying, the material may cake up or turn into a sludge during the drying step. The washing may be performed using a variety of methods or combination thereof, some of which have been demonstrated in the embodiments herein. The agitation may be stopped and the powder allowed to settle to the bottom of the reactor and the top liquid phase may be removed by decantation or a J-tube. The powder material may then be washed by adding fresh solvent and re-starting the agitation and repeating the washing process as needed until the wetcake may be transferred directly to the dryer. The powder may also be isolated and washed using a Buchner funnel, a nutsche filter, or a centrifuge with the washings happening before or on the filtering medium. The polymer powder may be collected externally on an FSI, sparkle or bag-type filter and re-loaded into the reactor for additional washes. A metal mesh screen may also be used to contain the powder within a reactor for additional washes. This process may potentially be repeated with numerous washes of various solvents until a powder with the desired properties is obtained.

Note that in certain instances a maximum percentage solids limit that may be obtained may range from 80 to 100% solids even after excessive washing. This may be due to a solvent that is strongly associated and trapped within the polymer particle structure and unable to diffuse out. In some embodiments, a maximum obtainable percentage of solids is directly correlated to the initial particle size produced upon precipitation, the polymer molecular weight, the choice of reaction solvent and anti-solvent, the temperature, the method and rpm of agitation, the time of contact between the resin solution and precipitation solvent or precipitated powder and wash solvent, and numerous other parameters.

In some embodiments, the wetcake from a process or apparatus may be loaded into a drying unit and dried until a powder with the desired properties is obtained. The powder polymer material may be air dried depending on the boiling point of the solvent. It may also be dried in an oven or vacuum oven with temperatures ranging from 20° C. to 100° C. though more preferred is 25° C. to 55° C. Other methods for drying the polymer powder are also possible by those who are skilled in the art using equipment similar to that which is used in thin film evaporators and heated belt systems. In order to dry the material to the final desired percentage of solids, any method which provides a gradient in temperature or pressure capable of removing the solvent is appropriate. In one embodiment, a combination of vacuum and drying methods may be utilized to drive the material to the highest percentage solids level possible, with the final residual solvent concentrations of the powder being well below the level required for reporting or toxicological concerns. In one embodiment, the precipitation, washing and drying operations are done in a single unit for efficacy in a horizontal reactor as described, but can also be done in a similar equivalent unit such as a conical screw mixing unit, double planetary mixing unit, a double ribbon, paddle, and continuous blender/dryer unit, a vee double cone blender/dryer unit, or a combination thereof.

In some embodiments, resin powder may be passed through a sieve or mesh screen to eliminate oversize or aggregated chunks of powder to help isolate the desired particle size distribution once it has been produced. Screen pore sizes typically range from 10 to 1000 µm, wherein a more preferred range is 300 to 600 µm.

Figure 3:
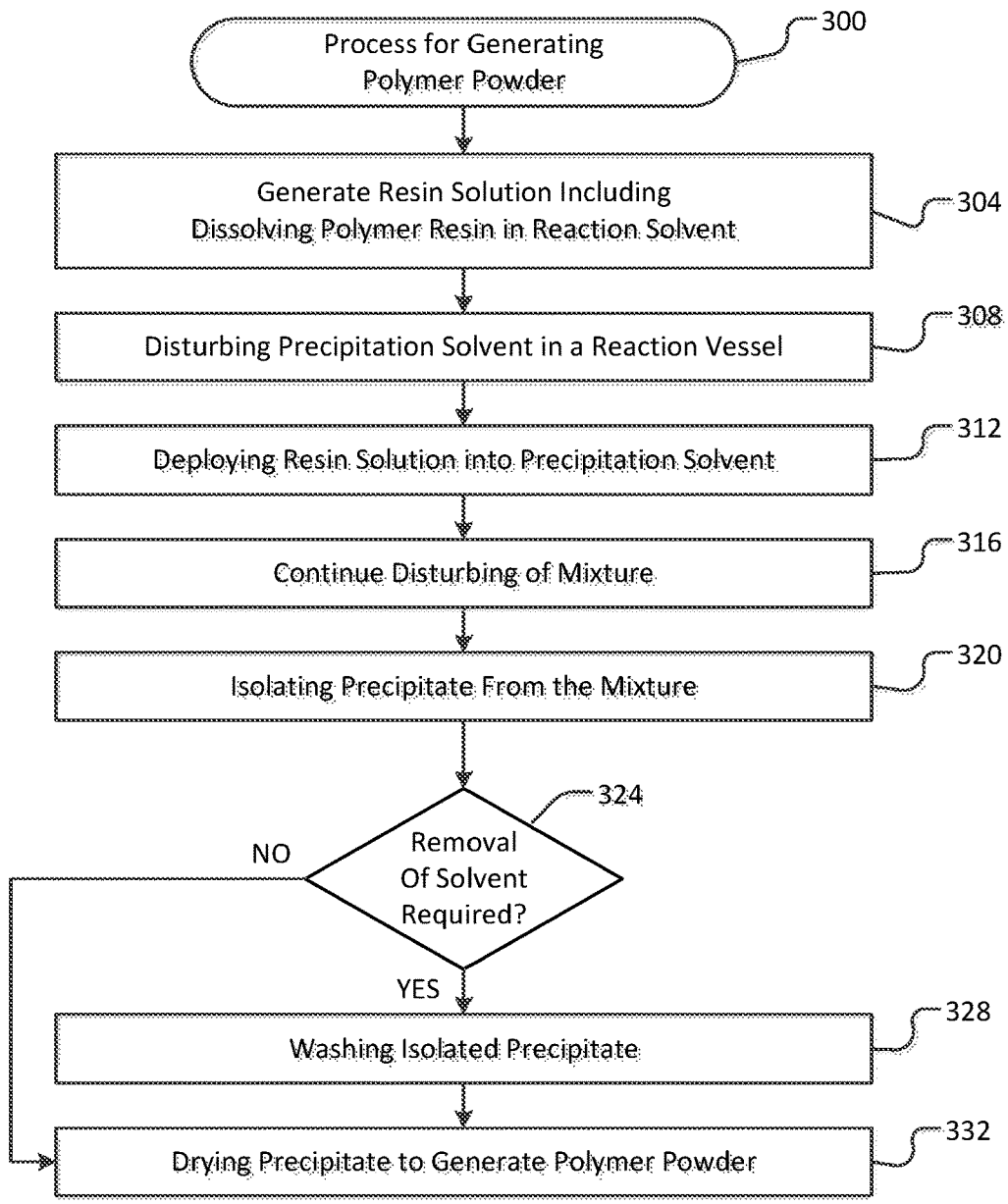
FIG. 3 is a flowchart to illustrate a process for generating polymer powder according to an embodiment.

FIG. 3 is a flowchart to illustrate a process for generating polymer powder according to an embodiment. In some embodiments, a process for generating a polymer powder includes:

304: Generating a resin solution including dissolving a polymer resin in a first reaction solvent.

308: Disturbing a second precipitation solvent in a chamber of reaction vessel, such as, for example, by agitating the precipitation solvent using an agitator. In some embodiments, the precipitation solvent is chosen based on the characteristics of the reaction solvent and the polymer resin.

312: Deploying the resin solution into the precipitation solvent, such as, for example, by spraying, spraying, jetting, misting, atomizing, or impregnating the resin solution into the precipitation solvent contained in the chamber of the reaction vessel, wherein deploying the resin solution may include utilizing a spray nozzle or other deployment element to generate droplets of the resin solution. The deployment of the resin solution into the precipitation solvent results in precipitation of the polymer from the mixture of the resin solution and precipitation solvent, or, stated in another way, generation of a precipitate.

316: In some embodiments, the disturbing of the precipitation solvent continues during the application of the resin solution, and further the disturbing of the resulting mixture or resin solution and precipitation solvent continues for a period of time after the deployment of the resin solution.

In some embodiments, the process continues with generating a polymer powder from the mixture of the resin solution and precipitation solvent, including:

320: Isolating (or separating) the precipitate from the mixture of the resin solution and precipitation solvent, wherein isolating of the precipitate may include, but it not limited to, decantation of the solvent from the mixture, filtration of the mixture, or a combination thereof.

324: If removal of a solvent is required, in some embodiments, the process further includes washing of the isolated precipitate, 328.

332: Drying the precipitate to generate the polymer. In some embodiments, the drying may include, but is not limited to, placing the precipitate into a dryer or oven at a certain temperature for a certain period of time.

In some embodiments, the isolation of the precipitate and the drying of the isolated precipitate occur at least in part in the same reaction vessel.

FIGS. 4A and 4B illustrate features of examples of implementations according to a corresponding embodiment. More specifically, FIG. 4A provides the following with regard to each example:

(a) Resin solution;
(b) Lot number of material;
(c) Concentration in percentage of solids;
(d) Viscosity;
(e) Resin temperature;
(f) Precipitation solution;

(g) Target ratio of initial MEK to resin by mass;
(h) Nozzle type;
(i) Fluid cap:
(j) Air cap:
(k) Liquid pressure;
(l) Air pressure;
(m) Feed rate.

Further, FIG. 4B further provides the following with regard to each example:
(a) Agitator used;
(b) Choppers operation;
(c) Ratio of MEK;
(d) Screen or powder separation;
(e) Drying method;
(f) Disposition of polymer material;
(g) Mean particle size;
(h) d95 in microns.

In some embodiments, a process or apparatus may include one or more of the following examples. However, embodiments are not limited to these examples or the specific manner in which the examples are implemented.

EXAMPLES

Example 1

A room temperature 26% solids PAI solution composed of 70:30 NFM:MEK was slowly poured into a vessel containing 100% MEK at ambient temperature with agitation supplied by a laboratory mixer set at 200 RPM equipped with a turbine agitator blade. The resin solution was fed over 1 hour with a 3:1 ratio of precipitation MEK:resin solution by mass. The solution was allowed to mix for 10 minutes after the addition, and the resulting material was allowed to settle. The MEK top layer was decanted and fresh MEK (in a ratio of 1.2:1 wash MEK:resin by mass) was added. The agitation was resumed for 10 minutes, then the material was allowed to settle for 1 hour. The precipitated powder material was washed again with the same ratio of fresh MEK, allowed to settle, and the top layer of MEK decanted. The resin was isolated using vacuum filtration and dried in a vacuum oven at 50° C. for 12 hours.

The PAI resin material produced using a laboratory agitator had a prill-like structure which resembled a noodle and was not a fine powder. The material may be further ground up by re-suspending in MEK and shearing with increased agitation speed (1000 rpm) for additional time, however, visually the material still had a grainy appearance closer to sand than fine powder. Furthermore, the material did not show an increase in percentage of solids when additional washes were performed. The particle size is expected to be directly related with the ability to wash and dry the material. Larger particles will allow for slower diffusion of the NFM into the MEK during washing. This typically resulted in a lower final solid content. Furthermore larger particle size results in slower drying. This typically results in longer drying times and also lower final solid content. This first example demonstrates the importance of agitation on the final product appearance and particle size.

Example II

The procedure of Example I was followed except the agitator used was a Silverson high shear mixer set at 4000 rpm instead of a laboratory mixer at 200 rpm. Since a laboratory benchtop horizontal reactor with choppers and a horizontal agitator was not available, the high shear mixer was used to as a replacement to emulate vigorous agitation. The resulting material after washing, isolation and vacuum drying was a fine powder. Though it is important to note that resin solution was only transferred in as a thin stream like Example I and not sprayed, like the examples further below. This example demonstrates the ability to produce a CMR-free PAI powder material due to the nature of the CMR-free reagents utilized. The novel powder had excellent solubility in organic solvents and was also formulated for use in water-based solutions.

Example III

This example was done on a commercial scale. A 71° F. 26% solids PAI solution composed of 70:30 NFM:MEK was transferred into a vessel containing 100% MEK at 51° F. with 100% agitation (100 rpm) over 1 h using a ball valve. Even at 100% agitation, the precipitation resulted in the formation of noodle-like material further supporting the importance of both the method of transfer (spraying) and agitation (choppers) when performing polymer precipitations.

The noodle-like material was washed twice using a 1.2:1 wash MEK:resin by mass, with the MEK phase being removed using a J-tube. The resin was isolated using a nutsche filter and dried in a dryer for 12 hours at 50° C. The resulting noodle-like material was reduced to powder using grinders, leading to additional cycle time. However, re-washing the ground powder did not result in a significant increase in solids, demonstrating the advantages of using nozzles to obtain a fine powder during the initial addition of the resin solution to the anti-solvent.

Example IV

The purpose of Examples IV-VIII was to attempt to obtain a fine powder through atomization by varying the viscosity of the resin solution, the fluid cap, the air cap, and the feed rate. A 1.5 L Parr reactor was filled with the same PAI solution composed of 70:30 NFM:MEK diluted with additional MEK to 1280 cP at 71° F. The resin solution was transferred to a pan of MEK through a ¼ J nozzle paired with a 100150 fluid cap and 1891125-SS air cap with a liquid pressure of 80 psi and an air pressure of 30 psi. This resulted in a feed rate of 3.6 g/min of the resin solution which was efficiently atomized from the nozzle resulting in the formation of a fine powder. The powder was isolated using vacuum filtration and dried in a 50° C. oven for 12 hours. The final powder material has a mean particle size of 167 µm and a d95 of 323 µm.

Example V

The procedure of Example IV was substantially repeated except using the undiluted 26% solids PAI solution composed of 70:30 NFM:MEK with a viscosity of 5539 cP and a liquid pressure of 80 psi and an air pressure of 75 psi. This resulted in a feed rate of 9.5 g/min of the resin solution which was efficiently atomized from the nozzle resulting in the formation of a fine powder. The final powder material has a mean particle size of 199 µm and a d95 of 329 µm.

Example VI

The procedure of Example V was substantially repeated except using a 180-SS air cap. This resulted in a feed rate of 27.5 g/min of the resin solution which was efficiently atomized from the nozzle resulting in the formation of a fine powder. The final powder material has a mean particle size of 146 μm and a d95 of 248 μm.

Example VII

The procedure of Example VI was substantially repeated except using a 60100 fluid cap and 120-SS air cap. This resulted in a feed rate of 10.0 g/min of the resin solution which was efficiently atomized from the nozzle resulting in the formation of a fine powder. The final powder material has a mean particle size of 152 μm and a d95 of 301 μm.

Example VIII

The procedure of Example VII was substantially repeated except using a 1401110-SS air cap. This resulted in a feed rate of 7.0 g/min of the resin solution which was efficiently atomized from the nozzle resulting in the formation of a fine powder. However flow rates as high as 62.1 g/min may be obtained by opening the ball valve and allowing more pressurized material to flow from the parr reactor to the nozzle. The final powder material has a mean particle size of 197 μm and a d95 of 328 μm.

Upon initial observation, it appears the lower viscosity resin used in Example IV vs V produced droplets of smaller particle size. However, testing of the high viscosity resin with different setups (notably Examples VI and VII) resulted in particles of lower size than that achieved with the low viscosity resin. These setups would most likely produce lower particle size droplets with the low viscosity resin, but the results indicate that setup optimization is available and effective. Furthermore, these results were achieved with no external MEK (antisolvent) agitation; the pressure from the spraying was the only agitation available. With added mixing, it is likely that particle size may be further optimized.

For Examples VII and VIII, it was observed that the spray angle may be altered by changing the orifice size of the air cap. Larger diameter outlets resulted in wider spray angles. Depending upon final reactor dimensions, this information may be used to appropriately space nozzles. A wider spray angle may result in more effective washing, as the same flow rate may be spread over a greater area, leading to better diffusion of the reaction solvent out of the polymer particles. If reactor dimensions, such as the use of a vertical reactor, dictate tight spacing of nozzles though, a narrower spray angle may be employed in order to prevent collision of separate spray streams before precipitation.

Example IX

For this example, the 26% solids PAI resin solution was transferred to a horizontal reactor equipped with a chopper agitating at 100% and a horizontal agitator at a speed of 150 RPM. The resin was transferred through a ¼ LNN 316SS Atomizing nozzle at a rate of 500 g/min into MEK with a ratio of MEK:resin of 2.2:1 by mass over 1 hour with the resin at ambient temperature and the reactor temperature set to 50° F. to keep the batch temperature below 120° F. due to heat generated from the choppers. The resin was transferred by pressurizing a feed tank to 80 psi, however at this pressure, the resin came out of the nozzle as a thin stream and not a spray. Once the transfer was complete the precipitation was allowed to agitate for an additional hour.

Note that the ratio of precipitation MEK:resin used in this example is smaller than previous examples where either a higher ratio or excess precipitation MEK was used. This may suggest that the increased level of agitation afforded by the chopper may allow for a lower ratio of precipitation MEK:resin which may results in significant cost reduction for the process.

The powder was isolated using an FSI bag filter and transferred back into the reactor for additional washings with fresh MEK. The powder was washed with a ratio fresh MEK:initial resin of 1.1:1 by mass for 20 minutes with the agitators at 100% and the agitator at 150 RPM. The powder was isolated and washed an additional time as described above, then the powder was collected and put back into the reactor for drying. The powder was dried for 4 hours at 120° F. and the powder was checked for dryness by running the percentage solids by moisture balance (MB) to constant weight (MB) oven solids (250° C., 1 hour). The material was passed through a 425 μm sieve and packed out to give a fine polymer powder.

The final powder material contained some oversize particles that had to be screened prior to packout. This is most likely due to the fact that the resin was not transferred into the reactor as a spray but as a stream which hit the chopper. Though the final material was in powder form, the particle size distribution may be further improved by optimizing the atomization of the transferred material using the nozzles. This example accurately demonstrates the tunable nature of this novel process where numerous parameters may potentially be altered to obtain the desired results on the powder polymer material.

Example X

For this example, the 26% solids PAI resin solution was transferred to a 4000 gal horizontal reactor equipped with three choppers agitating at 100% and a horizontal agitator at a speed of 95 RPM. The resin was transferred through a ¼ LNN 316SS Atomizing nozzle at a rate of 2668 g/min into MEK with a ratio of MEK:resin of 2.2:1 by mass over 1 hour with the resin at ambient temperature and the reactor temperature set to 50° F. to keep the batch temperature below 120° F. due to heat generated from the choppers. The resin was transferred by pressurizing the feed tank to 30 psi. Once the transfer was complete the precipitation was allowed to agitate for an additional hour. The powder was isolated using an FSI bag filter and transferred back into the reactor for additional washings with fresh MEK. The powder was washed with a ratio fresh MEK:initial resin of 1.1:1 by mass with the agitators at 100% and the agitator at 95 RPM. The powder was isolated and washed an additional time as described above and dried to give a fine powder with a mean particle size of 141 μm and a d95 of 210 μm.

While Examples I and II explore using different type agitators with no spray nozzles, and Examples IV-VIII evaluate spray nozzles with no agitation of the MEK precipitation solvent, Examples IX and X allow both the spraying and agitation as well as numerous other parameters to be fine-tuned which clearly demonstrates the potential and captures the novelty of this embodiment.

Example XI

For Example XI, a room temperature 28% solids water-based PAI solution composed of NFM, TEA, and water was slowly poured into a vessel containing 50:50 MEK:acetone at ambient temperature with agitation supplied by a Silverson High shear mixer set at 4000 RPM. The 3615-APH water-based polyamide-imide resin solution is slowly added over 1 hour resulting in the precipitation of polymer powder.

The agitator is stopped and the powder is allowed to settle. The solvent top phase is decanted from the beaker. Additional fresh solvent is added to the beaker (acetone) and the powder is washed for 10 minutes at 4000 rpm, followed by decantation. The wash/decant step is repeated. The powder is isolated by filtration and washed with additional acetone and dried at 50° C. overnight for 12 hours to give the off-white powder with a mean particle size of 54 μm and a d95 of 120 μm.

Example XI demonstrates the versatility of this process as a completely different resin solution (notably a polyamide imide that has been converted to the corresponding polyamide amic acid salt (also referred to as a polyamic acid or salt of any of the aforementioned terms) is used along with a different precipitation co-solvent (acetone). It is understood that an aqueous-based polyamide-amic acid formulation composed of PAI, water, solvent, and any tertiary amine such as trimethylamine, dimethylethanolamine, dimethylethylamine, or a combination thereof or an alternate base could be taken through the process described in this embodiment and converted to the corresponding powder. This example also demonstrates how the methodology contained in this embodiment could be used for numerous types of polymers such as PEEK (Polyether ether ketone), PI (Polyimide), PBI (Polybenzimidazole), polyphenylsulfones, polysulfones, polyarylsulfones, polyamides, PEI (polyethylene imine), epoxides, polyether sulfones, polyesters, polyacrylates, polysulfones, and mixtures, blends, grafts, derivatives, and/or copolymer mixtures thereof. Furthermore, this particular example utilizes CMR-free reagents and is an example of how a water-soluble CMR-free PAI powder may be produced. This particular powder process may also be scaled up to the inventive manufacturing examples above.

Example XII

The purpose of Examples XII-XVI is to once again demonstrate the versatility of the process and show how different methods of agitation (static, lab reactor, or Silverson high shear mixer) and even isolation methods (laboratory vacuum filtration vs. centrifuge) can be implemented in this process and alter the particle size and other potential properties of the final dried powder. Furthermore, unlike examples IV-VIII, the ratios of MEK:resin solution were not in excess and held constant. This allowed the effect of agitator type to be explored exclusively.

In Example XII, the resin 26% solids PAI polymer solution was precipitated into MEK with no agitation to explore the importance of agitation on the powder precipitation when using these limited solvent ratios. The lack of MEK precipitation solvent resulted in the aggregation of the powder material into a sludge. The small amount of powder which remained free was then more effectively washed by the MEK, resulting in a powder with a mean particle size of 229 μm. This shows the ability of the agitation to affect both the precipitation and the washing steps.

Example XIII

In Example XIII, the conditions used were identical to Example XII except a laboratory agitator set to 200 rpm was used to stir the MEK. The resin solution precipitated after spraying into the MEK, however upon drying, the powder aggregated into a sludge. This indicated inefficient washing most likely induced by the low agitation rate.

Example XIV

For Example XIV the same conditions as example XII were used except a Silverson high shear mixture set at 4000 rpm was used to stir the MEK during the precipitation and washing steps. This resulted in the formation of a fine powder with a mean particle size of 314 μm with only some aggregation.

Example XV

For Example XV the same conditions as example XII were used except a Silverson high shear mixture set at 4000 rpm was used to stir the MEK during the precipitation. The washing and isolation steps were performed on a centrifuge. Numerous manufacturing methods exist to isolate the powder such as a nutsche filter, a centrifuge, a FSI bag filter, a sparkle filter, or a metal wire mesh screen. This example implemented a centrifuge with a 30 μm centrifuge cloth. The final powder after washing had a mean particle size of 135 μm.

One embodiment of the present invention explores the effect of centrifuge speed on the final percentage solids of the powder. It was found that lower centrifuge speed led to a drier powder, perhaps due to a balance between the diffusion time necessary for wash MEK to remove the NFM from the polymer resin. The preferred rpm of the centrifuge for powder washing may be in the range of 100-10,000 rpm with a more preferred range of 1000-6000 rpm.

Example XVI

For Example XV the same conditions as example XII were used except a laboratory agitator at 200 rpm was used to stir the MEK during the precipitation. The washing and isolation steps were performed on a centrifuge. Unlike example XIII, the final PAI powder after drying was fine and had a mean particle size of 314 μm. This suggests that the centrifuge in conjunction with the described embodiment not only has benefits for isolation of the powder but perhaps offers the opportunity for improved washes relative to methods which resemble ordinary vacuum filtration. This example also supports that the proper nozzle chosen in combination with a sufficient isolation/wash method, such as a centrifuge, might be able to compensate for lack of excessive agitation (such as choppers). Furthermore, this example demonstrates that the methodology described in this embodiment may be expandable to other reactor and dryer systems such as a centrifuge, a vertical cylindrical kettle-type reactor, a continuous stirred tank reactors (CSTR), a plug flow reactor, a laminar-flow reactor, a semi-batch reactor, a conical screw mixing unit, a double planetary mixing unit, a double ribbon, paddle, and continuous blender/dryer unit, a vee double cone blender/dryer unit, a mixture thereof, or additional types of reactor configurations by those who are skilled in the art.

We claim:
1. A method comprising:
   generating a resin solution including dissolving a polymer resin into a first reaction solvent, wherein the polymer resin solution comprises a) an amine b) one or more co-solvents, and c) water;
   deploying the resin solution into a precipitation solvent in a chamber of a reaction vessel to create a resulting mixture, wherein deploying the resin solution includes generating droplets of the resin solution;
   disturbing the resulting mixture of the resin solution and the precipitation solvent, wherein the mixture produces a precipitate; and generating a polymer powder from the mixture, including:
  isolating the precipitate from a remaining portion of the mixture, and
  drying the isolated precipitate.

2. The method of claim 1, wherein the isolating of the precipitate and the drying of the isolated precipitate occurs in the same reaction vessel.

3. The method of claim 1, wherein deploying includes one of spraying, jetting, misting, atomizing, or impregnating the droplets of the resin solution into the precipitation solvent.

4. The method of claim 1, wherein disturbing the mixture includes agitating the mixture.

5. The method of claim 1, wherein the reaction vessel is a horizontal reactor including a cylindrical portion having a horizontal orientation.

6. The method of claim 1, where the reaction vessel is a vertical cylindrical kettle-type reactor, a continuous stirred tank reactors (CSTR), a plug flow reactor, a laminar-flow reactor, a semi-batch reactor, a conical screw mixing unit, a double planetary mixing unit, a double ribbon, paddle, and continuous blender/dryer unit, a vee double cone blender/dryer unit, or a mixture thereof.

7. The method of claim 1, where agitating the resulting mixture is performed by an anchor, turbine, plow, or corkscrew primary agitator, optionally in further combination with an additional high agitation unit comprising choppers, in-line high shear mixers, dispersing units, emulsifier units, blending units, alone or as part of a combination thereof.

8. The method of claim 1, wherein generating the polymer powder from the mixture further includes washing the isolated precipitate with one or more solvents in the same or adjoining reaction vessel.

9. The method of claim 1, wherein the polymer resin comprises PAI (Polyamide-imide), polyamic acid resin, salts from which polyamideimide may be derived, or a combination thereof.

10. The method of claim 1, wherein the polymer resin comprises one of PEEK (Polyether ether ketone), PI (Polyimide), PBI (Polybenzimidazole), polyphenylsulfones, polysulfones, polyarylsulfones, polyamides, PEI (polyethylene imine), epoxides, polyether sulfones, polyesters, polyacrylates, polysulfones, and mixtures, blends, grafts, derivatives, and/or copolymer mixtures thereof.

11. The method of claim 1, wherein the polymer resin solution comprises a polyamide-amic acid, water, N-formyl morpholine (NFM), and the tertiary aliphatic amine triethylamine (TEA).

12. The method of claim 1, wherein the polymer resin solution is composed of a polyamide-amic acid, water, N-formyl morpholine (NFM), and a water-soluble base comprising tertiary aliphatic amines, cyclic tertiary amines, alkanol amines, diamines, polyfunctional amines and mixtures or derivatives thereof.

13. The method of claim 10 wherein the one or more co-solvents is selected from but not limited to alcohols, amides, acetates, aldehydes, ethers, ketones, lactams, pyrrolidones, morpholines, morpholine derivatives, sulfoxides and mixtures thereof.

14. The method of claim 13, wherein the one or more solvents comprises one or more of N-methyl-2-pyrrolidone (NMP), N-formyl morpholine (NFM) and N-acetyl morpholine (NAM), diethyl acetamide (DEAc), di-n-propyl acetamide, diacetylpiperazine, N,N-diisopropylacetamide (DIPAc), di-n-butylacetamide (DIBAc), di-n-propylacetamide (DIPA), and N-propionyl morpholine (NPM), methyl acetate, n-propyl acetate, t-butyl acetate, iso-butyl acetate, ethyl acetate, isopropyl acetate, methyl lactate, ethyl lactate, n-propyl lactate, isopropyl lactate, n-butyl lactate, isobutyl lactate, t-butyl lactate, cyclohexanone, cyclopentanone, n-butyl acetate, methyl alcohol, ethyl alcohol, isopropyl alcohol, anisol, n-acetyl morpholine, ε-caprolactone, methylcyclohexane, N-n-butylpyrrolidone, N-isobutylpyrrolidone, N-t-butylpyrrolidone, N-n-pentylpyrrolidone, N-(methyl-substituted butyl)pyrrolidone, ring-methyl-substituted N-propyl pyrrolidone, ring-methyl-substituted N-butyl pyrrolidone, N-(methoxypropyl)pyrrolidone, N-(methoxypropyl)pyrrolidone, 1,5-dimethyl-pyrrolidone and isomers thereof, dipropylene glycol dimethyl ether, a mixture including ethyl lactate and an ethyl ester derived from soya bean oil or corn oil, poly(ethylene glycol) dimethyl ether, diethylene glycol diethyl ether, 1,3-dioxolane, dimethyl sulphoxide, methyl-5-(dimethylamino)-2-methyl-5-oxopentanoate, propylene glycol methyl ether acetate, 3-methoxy N,N-dimethylpropanamide, choline hydroxide, propylene carbonate, diethyl carbonate, glycerine carbonate, dimethylisopropylamine and isomers thereof, dihydrolevo glucosenone, octyl pyrrolidone and isomers thereof, N-methyl-ε-caprolactam, N,N,N',N'-tetramethylguanidine, 2-pyrrolidone, 2,2-dimethyl dioxolane-4-methanol and isomers thereof, dimethyl glutarate, dimethyl succinate, dimethyl adipate, diethylethanolamine and, N-ethylmorpholine, γ-hexalactone, tetrahydrofuran (THF), furfuryl alcohol, acetophenone, cumene, cyclopentylmethyl ether, methyltetrahydrofuran (methyl-THF), N-octyl pyrrolidone, dioxalane, methylethylketone, dimethyl succinate, N-methyl-caprolactame, N-cyclohexylpyrrolidone, and anisol.

15. The method of claim 1, wherein the polymer powder includes a mean particle size between 10 microns and 500 microns.

16. The method of claim 1, wherein the reaction solvent and precipitation solvent each have a boiling point within a range of 50 degrees Celsius and 240 degrees Celsius.

17. The method of claim 16, wherein the reaction solvent boiling point and precipitation solvent boiling point differ from each by at least 10 degrees Celsius.

18. The method of claim 1, wherein isolating the precipitate includes filtration of the precipitate using a centrifuge and subsequent washing of the powder product.

19. The method of claim 1, wherein isolating the precipitate includes filtration of the precipitate using a nutsche filter, a FSI bag filter, a sparkle filter, a metal wire mesh screen, or a combination thereof and subsequent washing of the powder product.

20. The method of claim 1, wherein drying the isolated precipitate includes one of air drying or oven drying of the isolated precipitate with or without vacuum.

21. The method of claim 1, further comprising passing the polymer powder through a sieve or mesh screen to isolate a desired particle distribution.

22. A polymer material generated by a process including:
  generating a resin solution including dissolving a polymer resin into a reaction solvent, wherein the polymer resin solution comprises a) an amine b) one or more co-solvents, and c) water;
  deploying the resin solution into a precipitation solvent contained in a chamber of a reaction vessel to generate a resulting mixture, wherein deploying the resin solution generating droplets of the resin solution, and wherein the second solvent is an anti-solvent;
  disturbing a resulting mixture of the resin solution and the precipitation solvent wherein the mixture produces a precipitate; and generating a polymer powder from the mixture, including:

isolating the precipitate from a remaining portion of the mixture, and drying the isolated precipitate.

23. The polymer material of claim 22, wherein deploying includes one of spraying, jetting, misting, atomizing, or impregnating the droplets of the resin solution into the precipitation solvent.

24. The polymer material of claim 22, wherein disturbing the mixture includes agitating the mixture.

25. The method of claim 12, wherein the tertiary aliphatic amines, cyclic tertiary amines, alkanol amines, diamines, polyfunctional amines and mixtures or derivatives thereof, comprise dimethylethanolamine (DMEA), dimethylethylamine, trimethyl amine, dimethylpropylamine, diethyl 2-hydroxyethyl amine, tripropyl amine, tributyl amine, tris(2-hydroxyethyl)amine, N,N-dimethylaniline, morpholine, pyridine, N-methyl-pyrrole, ethyl bis(2-hydroxyethyl) amine.

* * * * *